(12) United States Patent
Hsiang et al.

(10) Patent No.: US 9,872,022 B2
(45) Date of Patent: Jan. 16, 2018

(54) METHOD AND APPARATUS FOR SAMPLE ADAPTIVE OFFSET PROCESSING

(71) Applicant: MediaTek Inc., Hsinchu (TW)

(72) Inventors: Shih-Ta Hsiang, New Taipei (TW); Chih-Ming Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 179 days.

(21) Appl. No.: 14/586,034

(22) Filed: Dec. 30, 2014

(65) Prior Publication Data

US 2015/0195533 A1    Jul. 9, 2015

Related U.S. Application Data

(60) Provisional application No. 61/923,418, filed on Jan. 3, 2014.

(51) Int. Cl.
*H04N 19/117* (2014.01)
*H04N 19/82* (2014.01)
*H04N 19/86* (2014.01)
*H04N 19/70* (2014.01)
H04N 19/154 (2014.01)
H04N 19/196 (2014.01)
H04N 19/172 (2014.01)

(52) U.S. Cl.
CPC ............ *H04N 19/117* (2014.11); *H04N 19/70* (2014.11); *H04N 19/82* (2014.11); *H04N 19/154* (2014.11); *H04N 19/172* (2014.11); *H04N 19/196* (2014.11); *H04N 19/86* (2014.11)

(58) Field of Classification Search
CPC ...... H04N 19/117; H04N 19/70; H04N 19/82; H04N 19/154; H04N 19/172; H04N 19/196; H04N 19/86
USPC ................................................ 375/2, 240.02
See application file for complete search history.

(56) References Cited

U.S. PATENT DOCUMENTS

| 2011/0243226 | A1* | 10/2011 | Choi | H04N 19/61 375/240.12 |
| 2012/0207227 | A1* | 8/2012 | Tsai | H04N 19/136 375/240.29 |
| 2013/0114678 | A1* | 5/2013 | Baylon | H04N 19/176 375/240.02 |
| 2013/0177068 | A1* | 7/2013 | Minoo | H04N 19/00127 375/240.02 |
| 2013/0266058 | A1* | 10/2013 | Minoo | H04N 19/00006 375/240.02 |

\* cited by examiner

*Primary Examiner* — William C Vaughn, Jr.
*Assistant Examiner* — Jae N Noh
(74) *Attorney, Agent, or Firm* — Oblon, McClelland, Maier & Neustadt, L.L.P.

(57) ABSTRACT

Implementations of sample adaptive offset (SAO) processing a reconstructed picture in an image or video coding system are described. In one example implementation, a method may receive input data associated with the reconstructed picture. The method may also perform multiple stages of SAO filtering operations on a SAO processing unit of at least a portion of the reconstructed picture. Information related to a SAO parameter set that signals one or more SAO types, one or more SAO subtypes, one or more SAO offset values, or a combination thereof, used by the multiple stages of SAO filtering operations are encoded or decoded.

21 Claims, 8 Drawing Sheets

METHOD AND APPARATUS FOR SAMPLE ADAPTIVE OFFSET PROCESSING

CROSS REFERENCE TO RELATED PATENT APPLICATION

This is a non-provisional patent application claiming the priority benefit of provisional patent application Ser. No. 61/923,418, filed on 3 Jan. 2014, which is incorporated by reference in its entirety.

TECHNICAL FIELD

Implementations of the present disclosure are generally related to sample adaptive offset (SAO) processing. In particular, implementations of the present disclosure are related to modified SAO processing to improve coding performance.

BACKGROUND

Unless otherwise indicated herein, approaches described in this section are not prior art to the claims listed below and are not admitted to be prior art by inclusion in this section.

High efficiency video coding (HEVC) is the new-generation international video coding standard developed by the Joint Collaborative Team on Video Coding (JCT-VC). The new standard is based on the conventional hybrid coding approach and its corresponding HEVC encoding system 100 is illustrated in FIG. 1. In this system, a picture is divided into multiple non-overlapped largest coding units, or called coding tree blocks (CTBs). The pixel values in a coding unit are first spatially or temporally predicted. The resulting residual signal is transformed for further redundancy removal. The transform coefficients are then quantized and entropy coded. The reconstructed picture recovered from the decoded residual signal and prediction signal is finally processed by in-loop filtering to further reduce coding artifacts.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one exemplary implementation, a method for SAO processing a reconstructed picture in an image or video coding system may receive input data associated with the reconstructed picture. The method may also perform multiple stages of SAO filtering operations on a SAO processing unit of at least a portion of the reconstructed picture. The method may further encode or decode information related to a SAO parameter set that signals one or more SAO types, one or more SAO subtypes, one or more SAO offset values, or a combination thereof, used by the multiple stages of SAO filtering operations.

In another exemplary implementation, a device implementable in an image or video coding system may include a reconstruction module, a SAO filter and a coding module. The reconstruction module may be configured to reconstruct a video picture. The SAO filter may be coupled to the reconstruction module to receive input data associated with the reconstructed video picture, a deblocked picture, or an in-loop filtered picture. The SAO filter may be configured to perform multiple stages of SAO filtering operations on a SAO processing unit of at least a portion of the reconstructed picture. The coding module may be configured to encode or decode information related to a SAO parameter set that signals one or more SAO types, one or more SAO subtypes, one or more SAO offset values, or a combination thereof, used by the SAO filter in performing the multiple stages of SAO filtering operations.

Implementations of the present disclosure enable more than one SAO filtering operations to be performed on each SAO processing unit, or coding tree unit (CTU). Existing SAO tools and syntax structure can be re-used for additional SAO filtering operations. Advantageously, by using more than one SAO tool of a plurality of existing SAO tools, picture quality as well as coding efficiency may be improved.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

Figure 1:
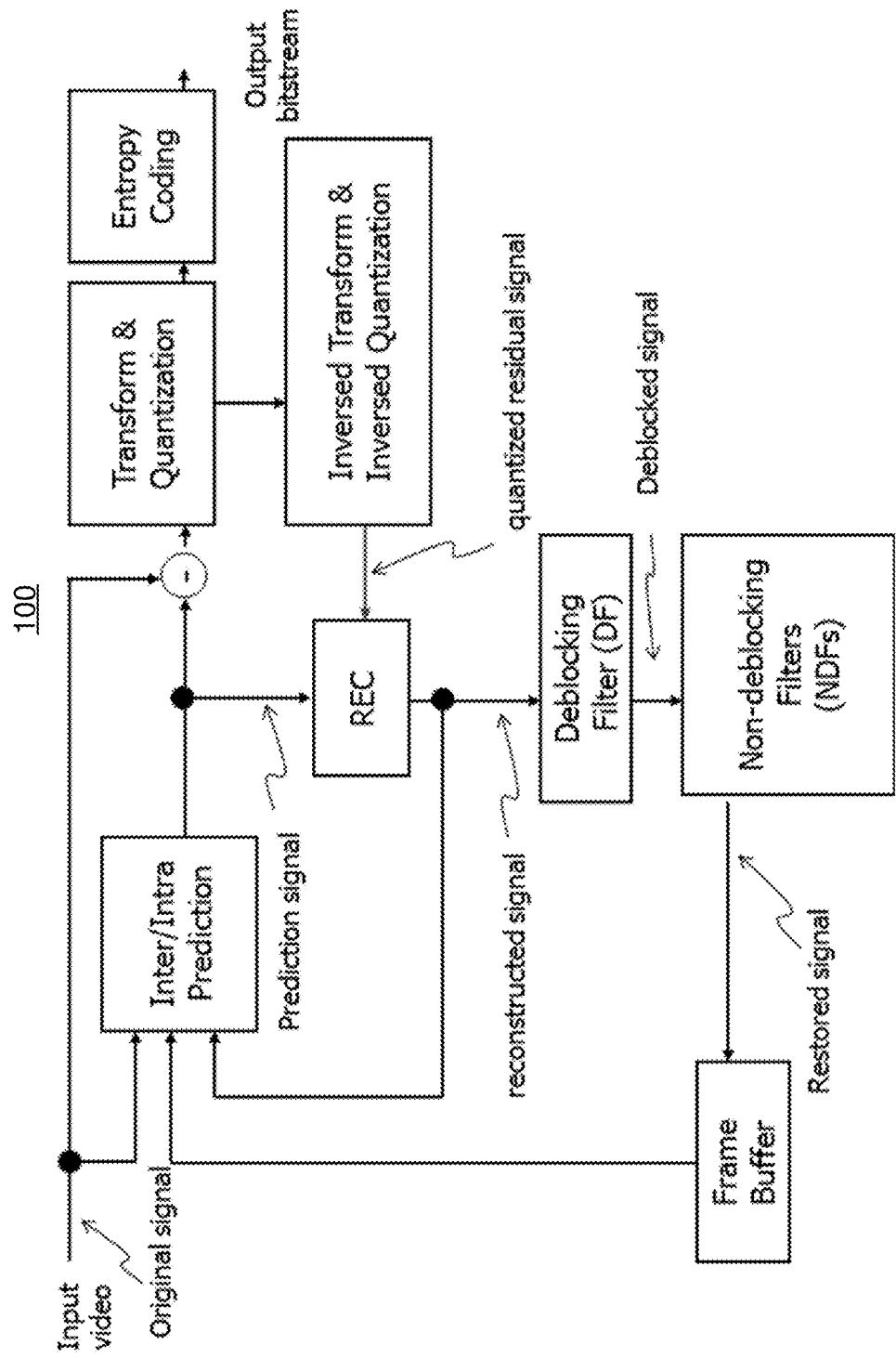
FIG. 1 is a block diagram illustrating a typical HEVC encoding system.
Figure 2:
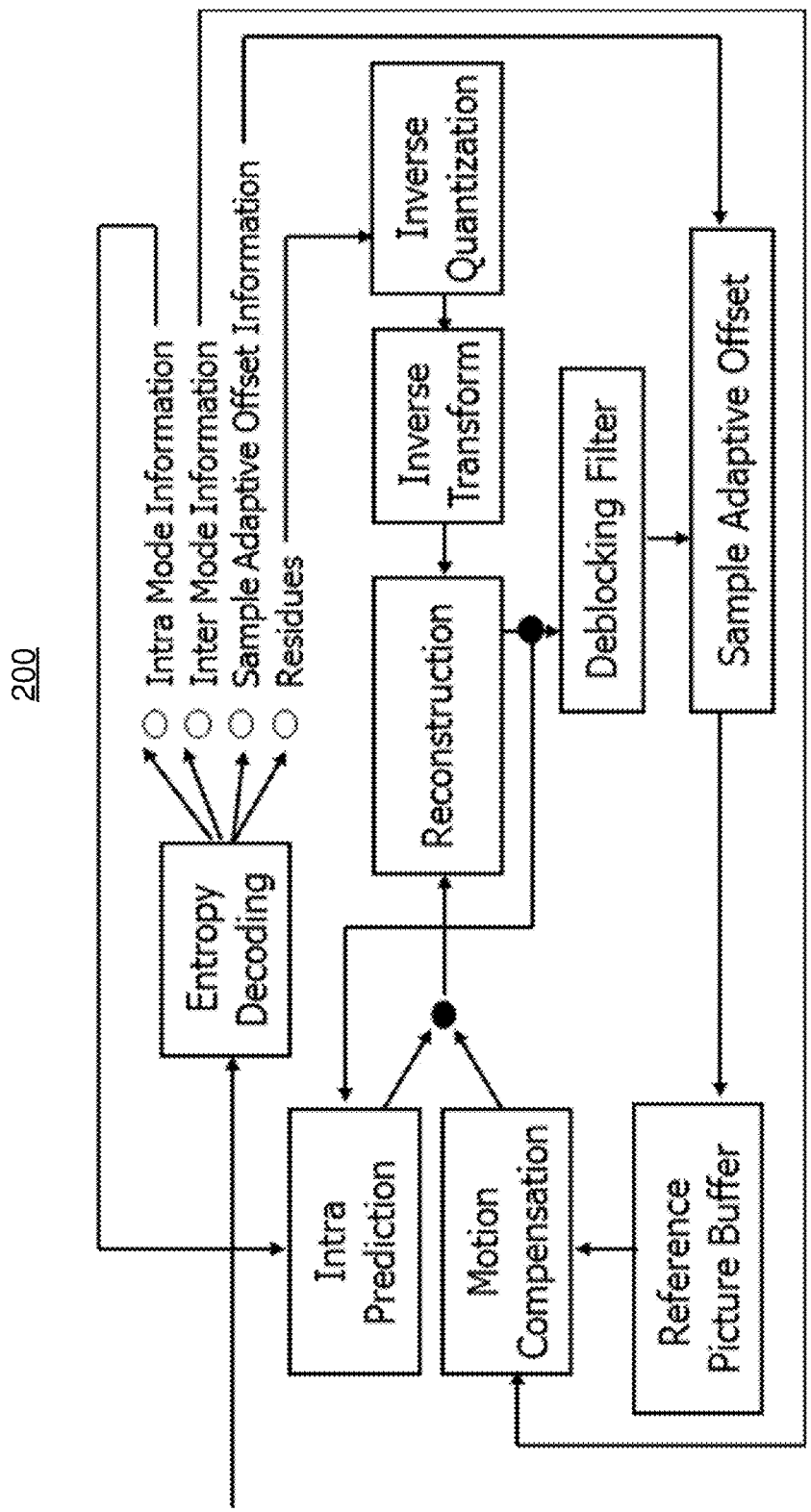
FIG. 2 is a block diagram illustrating a typical HEVC decoder.

In the HEVC standard, sample adaptive offset (SAO) processing is utilized to reduce the distortion of reconstructed pictures. FIG. 2 shows a block diagram of a typical HEVC decoder 200. The SAO processing is performed after deblocking filtering (DF) and is part of the non-deblock filtering (NDFs) operation in FIG. 1. The concept of SAO is to classify the reconstructed pixels into categories according to pixel values. Each category is then assigned an offset value coded in the bitstream and the distortion of the reconstructed signal is reduced by adding the offset value to the reconstructed pixels in each category. In the HEVC standard, the SAO tool supports two kinds of pixel classification methods: band offset (BO) and edge offset (EO).

Figure 3:
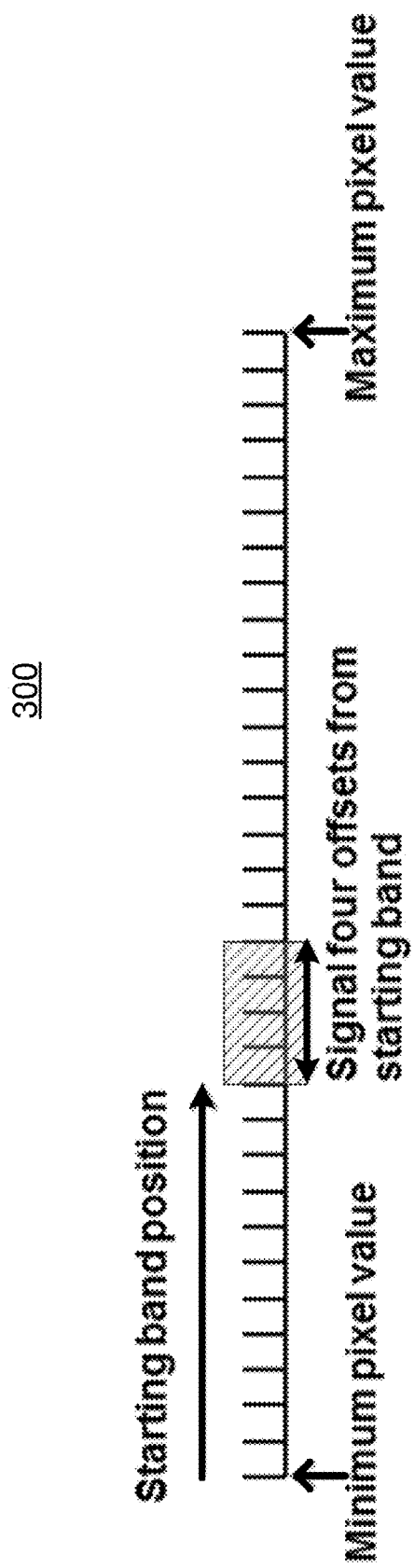
FIG. 3 is a diagram illustrating pixel intensity range equally divided into 32 bands by band offset in accordance with an implementation of the present disclosure.

The concept of BO is to classify the reconstructed pixels into bands by quantizing the pixel magnitude, as shown in graph 300 of FIG. 3. An offset value can then be derived for each band to reduce the distortion of the reconstructed pixels in the band. A group of four offsets identified by the starting band position are selected and coded into the bitstream.

The concept of EO is to classify the reconstructed pixels into categories by comparing the current pixel with its neighboring pixels along the direction identified by the EO type. Table 1 below shows the mapping scheme employed by HEVC for the EO pixel classification, where "c" denotes a current pixel to be classified. That is, the category index, cat_idx, for the current pixel "c" can be determined by the expression below, shown as Equation (1) and Equation (2):

$$\text{cat\_idx} = \text{sign}(c\text{-}c1) + \text{sign}(c\text{-}c\text{-}1) + 2 \quad (1)$$

$$\text{sign}(x) = \begin{cases} 1; & x > 0 \\ 0; & x = 0 \\ -1; & x < 0 \end{cases} \quad (2)$$

Figure 4:
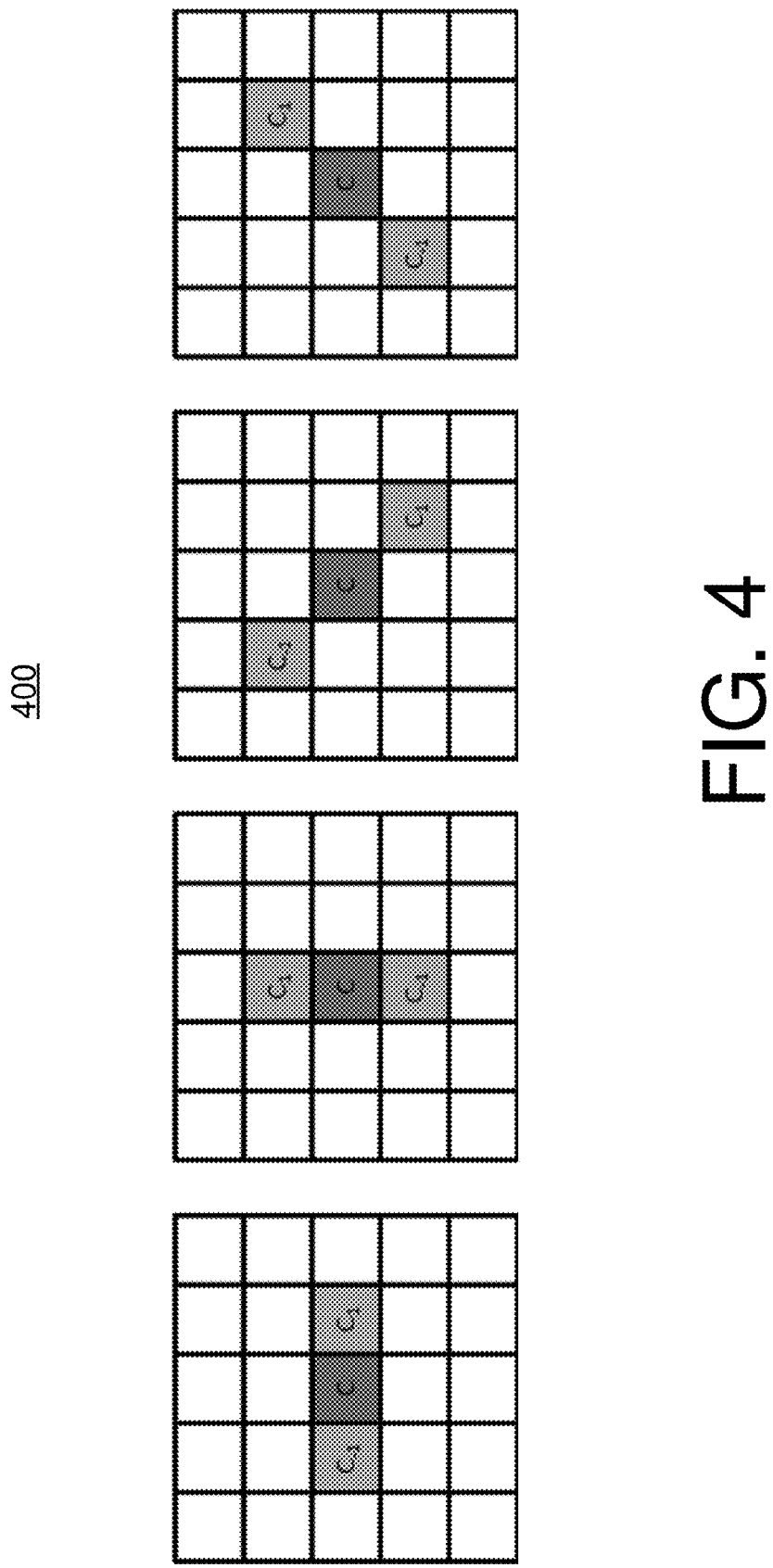
FIG. 4 is a diagram illustrating four edge offset classes in HEVC in accordance with an implementation of the present disclosure.

In Equation (1), "c1" and "c−1" are the neighboring pixels corresponding to a given EO class. FIG. 4 shows a graph 400 of four EO classes with selections of neighboring pixels from different orientations. An offset value is derived for all pixels in each category. Four offset values, respectively corresponding to category indices 1-4, are coded in one coding tree block (CTB, or largest coding unit (LCU)) in HEVC.

TABLE 1

EO Pixel Classification

| Category | Condition |
|---|---|
| 1 | c < 2 neighbors |
| 2 | c < 1 neighbor && c == 1 neighbor |
| 3 | c > 1 neighbor && c == 1 neighbor |
| 4 | c > 2 neighbors |
| 0 | None of the above |

For each color component (luma or chroma), the SAO algorithm can divide a picture into non-overlapped regions, and each region can select one SAO type among BO (with starting band position), EO (select one out of the four classes), and no processing (OFF). The SAO partitioning can be aligned with the CTB boundaries to facilitate the CTB-based processing. The total number of offset values in one picture depends on the number of region partitions and the SAO type selected by each region.

Figure 5:
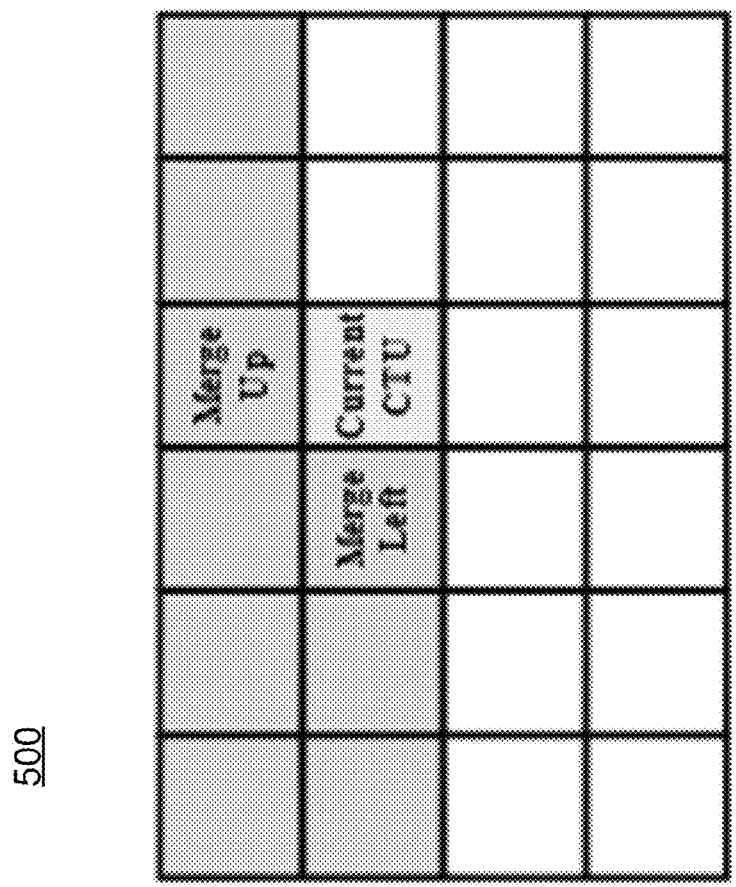
FIG. 5 is a diagram illustrating a coding tree unit (CTU) including multiple coding tree blocks (CTBs) of three color components in accordance with an implementation of the present disclosure.
Figure 5:
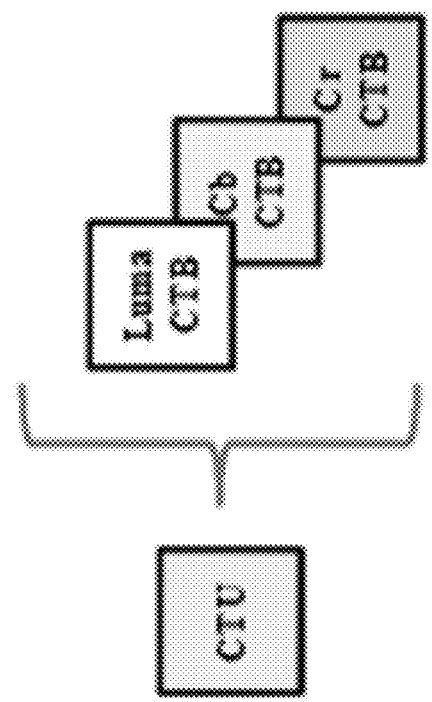

In the HEVC standard, each CTB can select no processing (SAO-off) or apply one of the various SAO types (classes): BO with starting band position index, 0-degree EO, 90-degree EO, 135-degree EO, and 45-degree EO. To further reduce side-information, SAO parameters of a current CTB can reuse those of its left or above CTB by using merge syntax as shown in graph 500 of FIG. 5. In FIG. 5, the CTU includes multiple CTBs of three color components, and the current CTU can reuse SAO parameters of the left or above CTU. SAO-related syntax elements include the following: sao_merge_left_flag, sao_merge_up_flag, sao_type_idx_luma, sao_type_idx_chroma, sao_eo_class_luma, sao_eo_class_chroma, sao_band_position, sao_offset_abs, and sao_offset_sign. The syntax element sao_merge_left_flag represents whether the current CTB reuses the parameters of its left CTB. The syntax element sao_merge_up_flag represents whether the current CTB reuses the parameters of its above (or upper) CTB. The syntax element sao_type_idx represents the selected SAO type (sao_type_idx_luma and sao_type_idx_chroma for luma component and chroma component, respectively). The syntax elements sao_eo_class_luma and sao_eo_class_chroma represent the selected EO class for luma and chroma, respectively. The syntax element sao_band_position represents the starting band position of the selected bands.

The syntax elements sao_offset_sign and sao_offset_abs respectively represent the sign and scaled magnitude of an offset value, SaoOffsetVal, given by Equation (3) below.

$$\text{SaoOffsetVal} = \text{offsetSign} * \text{sao\_offset\_abs} << (\text{bitDepth} - \text{Min}(\text{bitDepth},10)) \quad (3)$$

In Equation (3), bitDepth is the number of the bits used for each component of a raw pixel. Moreover, offsetSign is equal to −1 when sao_offset_sign is equal to 1, and is equal to 1 when sao_offset_sign is not equal to 1. The syntax element sao_offset_abs is entropy coded using truncated Rice (TR) binarization process with the parameters given by Equation (4) below.

$$c\text{Max} = (1 << (\text{Min}(\text{bitDepth},10) - 5)) - 1, c\text{RiceParam} = 0 \quad (4)$$

Figure 6:
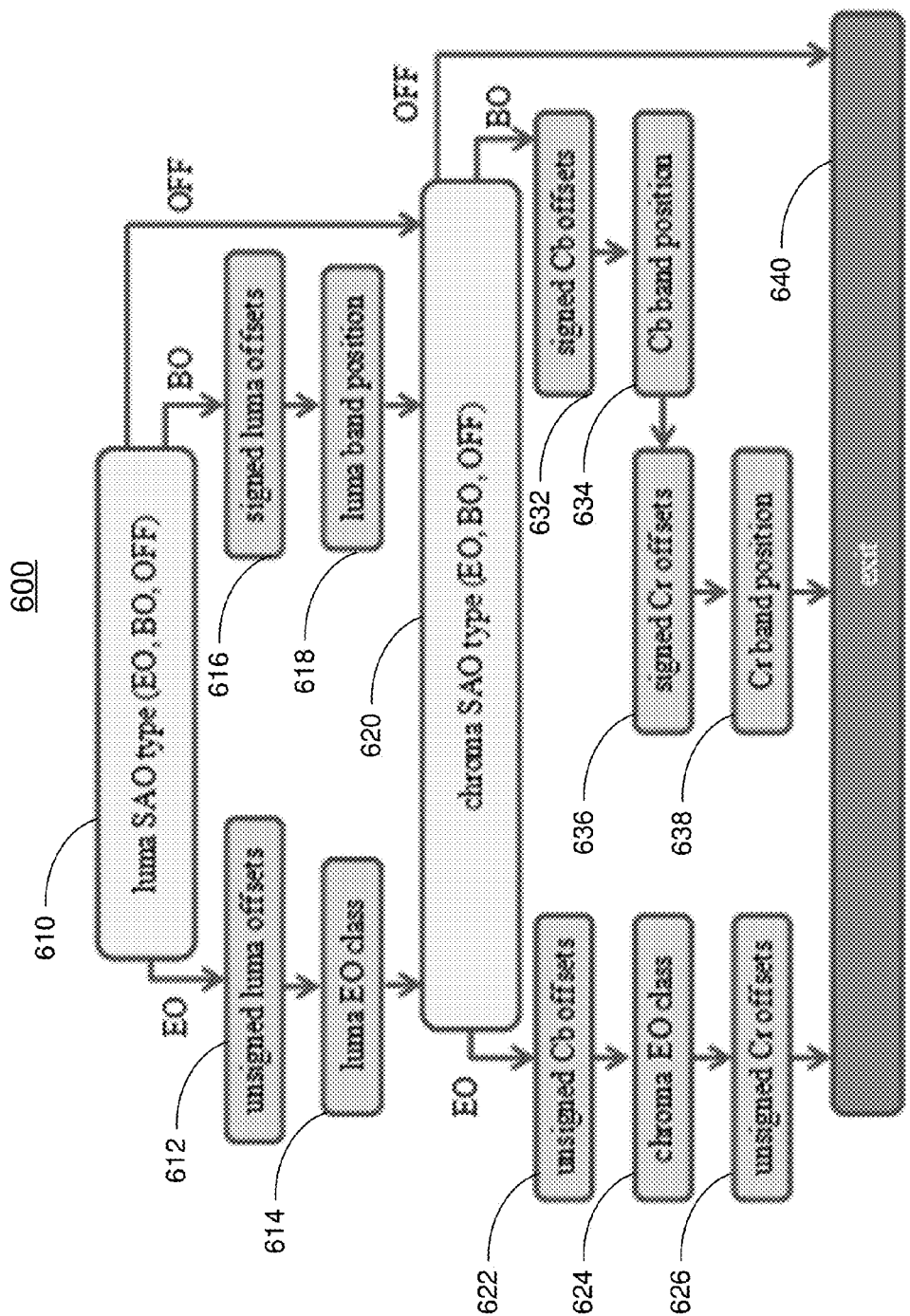
FIG. 6 is a diagram illustrating an exemplary process of coding CTU-level SAO information when the current CTU is not merged with the left or above CTU in accordance with another implementation of the present disclosure.

FIG. 6 illustrates a process 600 of coding the rest CTU-level SAO information when the current CTU is not merged with the left or above CTU. Note that EO classes and band position is a kind of sub-class or sub-type to describe the SAO type information. As shown in FIG. 6, the SAO type decision is made in step 610. If it is an EO type, the unsigned luma offsets (612) and luma EO class (614) are coded in the bitstream. If the SAO type is BO, signed luma offset (616) and luma band position (618) are coded in the bitstream. If SAO type is off, no other SAO information is signaled and the process goes to step 620. Similar SAO information for the chroma components follow. If the chroma components select EO, the unsigned Cb offsets (622), chroma EO class (624) and unsigned Cr offsets (626) are signaled. If the chroma components select BO, the signed Cb offsets (632), Cb band position (634), signed Cr offsets (636) and Cb band position (638) are signaled. If the SAO type is off for the chroma components, no other SAO information is signaled and the process goes to step 640.

Example Implementations

The SAO scheme provides a rich set of the SAO tools for SAO filtering. However, the current SAO filtering method, as included in the HEVC version 1, only allows selecting one of the SAO tools for each color component in a CTU to process the reconstructed pixels.

The present disclosure proposes to support the use of multiple SAO filtering operations for processing individual pixel samples from a reconstructed picture in an image or video coding system. Each SAO filtering operation is signaled by a coded SAO parameter set and performed on a SAO processing unit covering a picture region. Specifically, according to the present disclosure, more than one SAO filtering operations are performed on each SAO processing unit, e.g., CTU. In some implementations, a new slice segment header syntax may be added to indicate the maximum number of SAO filtering operations for each CTU. In some implementations, each additional SAO filtering operation may be performed on one or more output pixels of a previous SAO filtering operation. In some implementations, additional SAO filtering operations may re-use the existing SAO tools for SAO filtering. In some implementations, the existing SAO syntax structure may be re-used for coding additional SAO parameter sets corresponding to the additional SAO filtering operations. In some implementations, a new sequence parameter set (SPS) syntax flag may be provided to enable usage of the additional SAO filtering operations. Table 2 below shows an example of modifications to SPS.

TABLE 2

Example Modifications to SPS

| seq_parameter_set_rbsp( ) { | Descriptor |
|---|---|
| ...... | |
| if( sps_extension_flag[ 0 ] ) { | |
| ...... | u(1) |
| if( sample_adaptive_offset_enabled_flag ) { | |
| multiple_sao_param_sets_enabled_flag | u(1) |
| } | |
| } | |
| ...... | |
| } | |

Table 3 below shows an example of modifications to slice segment header.

TABLE 3

Example Modifications to Slice Segment Header

| slice_segment_header( ) { | Descriptor |
|---|---|
| ...... | |
| if( sample_adaptive_offset_enabled_flag ) { | |
| if(multiple_sao_param_sets_enabled_flag) | |
| number_sao_param_sets | ue(v) |
| for(saoId=0; saoId < numer_sao_param_sets; saoId++) | |
| { | |
| slice_sao_luma_flag[saoId] | u(1) |
| if(ChromaArrayType > 0) | |
| Slice_sao_chroma_flag[saoId] | u(1) |
| } | |
| } | |
| ...... | |
| } | |

Table 4 below shows an example of modifications to CTU.

TABLE 4

Example Modifications to CTU

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| for(saoId=0; saoId < number_sao_param_sets; saoId++) { | |
| if( slice_sao_luma_flag[saoId] \|\| slice_sao_chroma_flag[saoId] ) | |
| Sao( xCtb >> CtbLog2SizeY, yCtb >> CtbLog2SizeY ) | |
| } | |
| coding_quadtree( xCtb, yCtb, CtbLog2SizeY, 0 ) | |
| } | |

The present disclosure proposes to further exploit existing SAO tools to achieve improved coding quality and efficiency. Implementations of the present disclosure may experimentally achieve modest bitrate savings on natural videos and high bitrate savings on screen content videos. Implementations of the present disclosure having EO stages cascaded with additional BO stages may not increase decoding complexity while preserving most coding gains.

Figure 7:
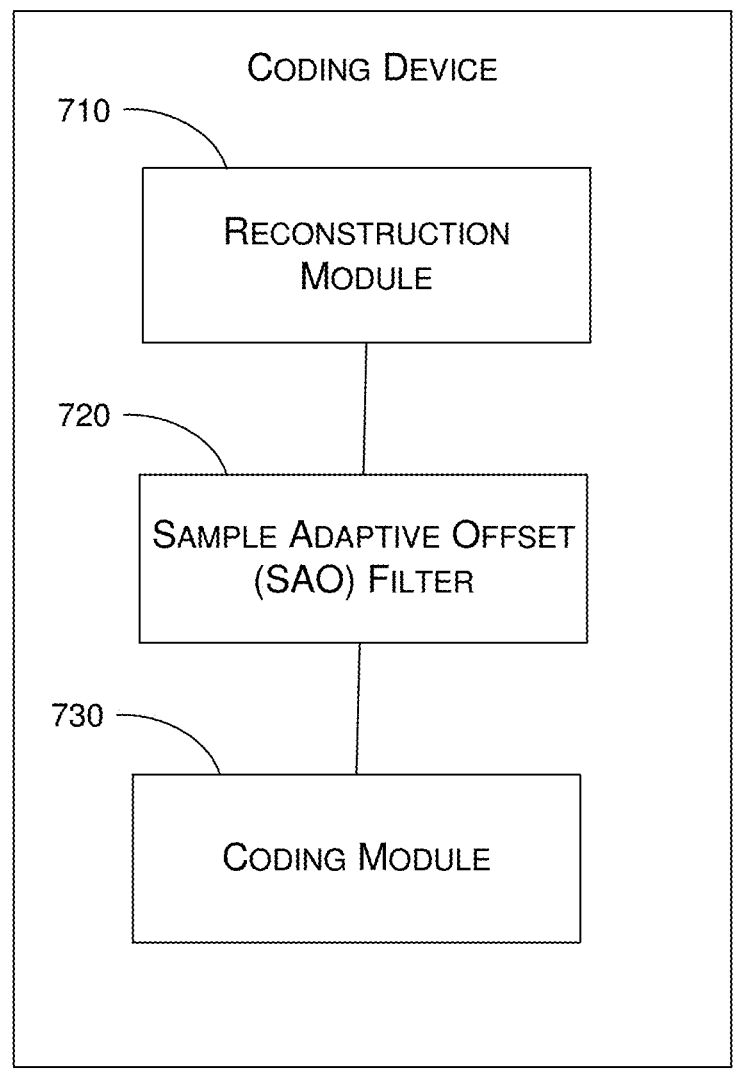
FIG. 7 is a block diagram of an exemplary device implementable in an image or video coding system in accordance with an implementation of the present disclosure.

FIG. 7 is a block diagram of an exemplary device 700 implementable in an image or video coding system in accordance with an implementation of the present disclosure.

Exemplary device 700 may perform various functions related to techniques, methods and approaches described herein, including example processes 800 described below and variations thereof. Exemplary device 700 may be implemented as a video encoder, a video decoder, or both a video encoder and a video decoder (e.g., video codec), and exemplary device 700 may be capable of SAO processing a reconstructed picture in compliance with HEVC. Exemplary device 700 may be implemented in the form of an integrated circuit (IC), a single chip, multiple chips or a chip set or an assembly of one or more chips and a printed circuit board (PCB).

Exemplary device 700 may include at least those components shown in FIG. 7, such as a reconstruction module 710, a SAO filter 720 and a coding module 730. Exemplary device 700 may also include additional components similar to those shown in FIG. 1 or FIG. 2. For example, exemplary device 700 may be implemented as a HEVC encoding system similar to HEVC encoding system 100 or a HEVC decoder similar to HEV decoder 200. Any, some or all of reconstruction module 710, SAO filter 720 and coding module 730 may be implemented by hardware, software, firmware, middleware or any combination thereof. In some implementations, components of exemplary device 700 are made of physical electronic components such as, for example, transistors, resistors and capacitors.

Reconstruction module 710 may be configured to reconstruct a video picture. In some embodiments, reconstruction module 710 may include a video filter applied to a decoded compressed video to improve visual quality and prediction performance by smoothing sharp edges which may form between blocks when block coding techniques are used.

SAO filter 720 may be coupled to deblocking filter 710 to receive input data associated with the reconstructed video picture, a deblocked picture or an in-loop filtered picture. SAO filter 720 may be configured to perform multiple stages of SAO filtering operations on a SAO processing unit of at least a portion of the reconstructed picture.

Coding module 730 may be configured to encode or decode information related to a SAO parameter set that signals one or more SAO types, one or more SAO subtypes, one or more SAO offset values, or a combination thereof, used by SAO filter 720 in performing the multiple stages of SAO filtering operations.

In at least some implementations, SAO filter 720 may be further configured to receive information related to a SAO parameter set that signals one or more SAO types, one or more SAO subtypes, one or more SAO offset values, or a combination thereof. In performing the multiple stages of SAO filtering operations using more than one SAO tools, SAO filter 720 may perform the multiple stages of SAO filtering operations using more than one SAO tools based on the information related to the SAO parameter set. Additionally, SAO filter 720 may be configured to signal the SAO parameter set corresponding to one or more SAO filtering operations of the multiple stages of SAO filtering operations that are used. Moreover, SAO filter 720 may also be configured to code a syntax element in a bitstream to indicate a number of the SAO filtering operations on a region of the reconstructed picture.

In at least some implementations, in performing the multiple stages of SAO filtering operations on the SAO processing unit, SAO filter 720 may be configured to perform a BO type of filtering operation in a consecutive order followed by an EO type of filtering operation or, alternatively, to perform the EO type of filtering operation in a consecutive order followed by the BO type of filtering operation.

In at least some implementations, SAO filter 720 may be further configured to identify either or both the EO type and the BO type by one or more indices of a parameter set that signals one or more SAO types, one or more SAO subtypes and one or more SAO offset values.

In at least some implementations, in performing the multiple stages of SAO filtering operations on the SAO processing unit, SAO filter 720 may be configured to utilize one or more output pixels from a previous SAO filtering operation for sample classification of a current SAO filtering operation to derive a SAO category index for the current SAO filtering operation.

In at least some implementations, in performing the multiple stages of SAO filtering operations on the SAO processing unit, SAO filter 720 may be configured to utilize one or more input pixels from the reconstructed picture subject to SAO processing for sample classification to derive one or more SAO category indices.

In at least some implementations, SAO filter 720 may be configured to perform the EO type of filtering operation before the BO type of filtering operation. SAO filter 720 may also be configured to perform the BO type of filtering operation by utilizing one or more output pixels from a final EO type of filtering operation for sample classification to derive one or more SAO category indices.

In at least some implementations, SAO filter 720 may be further configured to predict values of one or more syntax elements in the SAO parameter set for a current SAO filtering operation based on related syntax elements of the SAO parameter set in a previous SAO filtering operation. SAO filter 720 may also be configured to utilize related syntax elements in the SAO parameter set in a previous SAO filtering operation for entropy coding the syntax elements in the SAO parameter set for a current SAO filtering operation to derive a modeling context. SAO filter 720 may also be configured to infer the one or more SAO offset values to be equal to zero for a first color component in a current SAO filtering operation in response to the one or more SAO offset values being equal to zero for the first color component in a previous SAO filtering operation for the SAO processing unit.

In one embodiment, the current SAO filtering operation and the previous SAO filtering operation may be of a same EO or BO type.

In at least some implementations, the SAO processing unit may include a coding tree unit (CTU).

In at least some implementations, SAO filter 720 may be further configured to re-use an existing syntax for coding the SAO parameter set to code the SAO parameter set for one or more additional SAO filtering operations in a CTU.

In at least some implementations, SAO filter 720 may be further configured to re-use an existing syntax for coding the SAO parameter set to code the SAO parameter set for one or more additional SAO filtering operations in a CTU except for skipping coding the SAO parameter set having the one or more SAO offset values equal to zero for all color components in a previous SAO filtering operation. SAO filter 720 may also infer uncoded parameter sets to be equal to zero.

In at least some implementations, SAO filter 720 may be further configured to code a syntax flag in a sequence parameter set (SPS) extension to enable usage of the more than one SAO tools on a CTU in a current coded bitstream. SAO filter 720 may also be configured to code a syntax element in a slice segment header to indicate a number of the SAO filtering operations on a CTU.

In at least some implementations, in performing the multiple stages of SAO filtering operations on the SAO processing unit of at least a portion of the reconstructed picture, SAO filter 720 may be configured to process a region of the reconstructed picture by a plurality of stages of SAO processing operations.

In at least some implementations, SAO filter 720 may be further configured to partition a region of the reconstructed picture in one stage of SAO processing operations by a quadtree decomposition. SAO filter 720 may also be configured to process each quadtree node region of the quadtree decomposition by a plurality of stages of SAO processing operations.

In at least some implementations, in performing the multiple stages of SAO filtering operations on the SAO processing unit, SAO filter 720 may be configured to perform the multiple stages of SAO filtering operations on a coding tree unit (CTU)-based SAO processing unit for at least one stage of SAO processing operations. SAO filter 720 may also be configured to perform the multiple stages of SAO filtering operations on a quadtree-based SAO processing unit for at least one stage of the SAO processing operations.

In at least some implementations, in performing the multiple stages of SAO filtering operations, SAO filter 720 may be configured to perform the multiple stages of SAO filtering operations in a pre-defined consecutive order without signaling the one or more SAO types or the one or more SAO subtypes.

In at least some implementations, a SAO processing unit may cover a region in the reconstructed picture, with a size of the region being adaptively controlled by a syntax element in the SAO parameter set.

Figure 8:
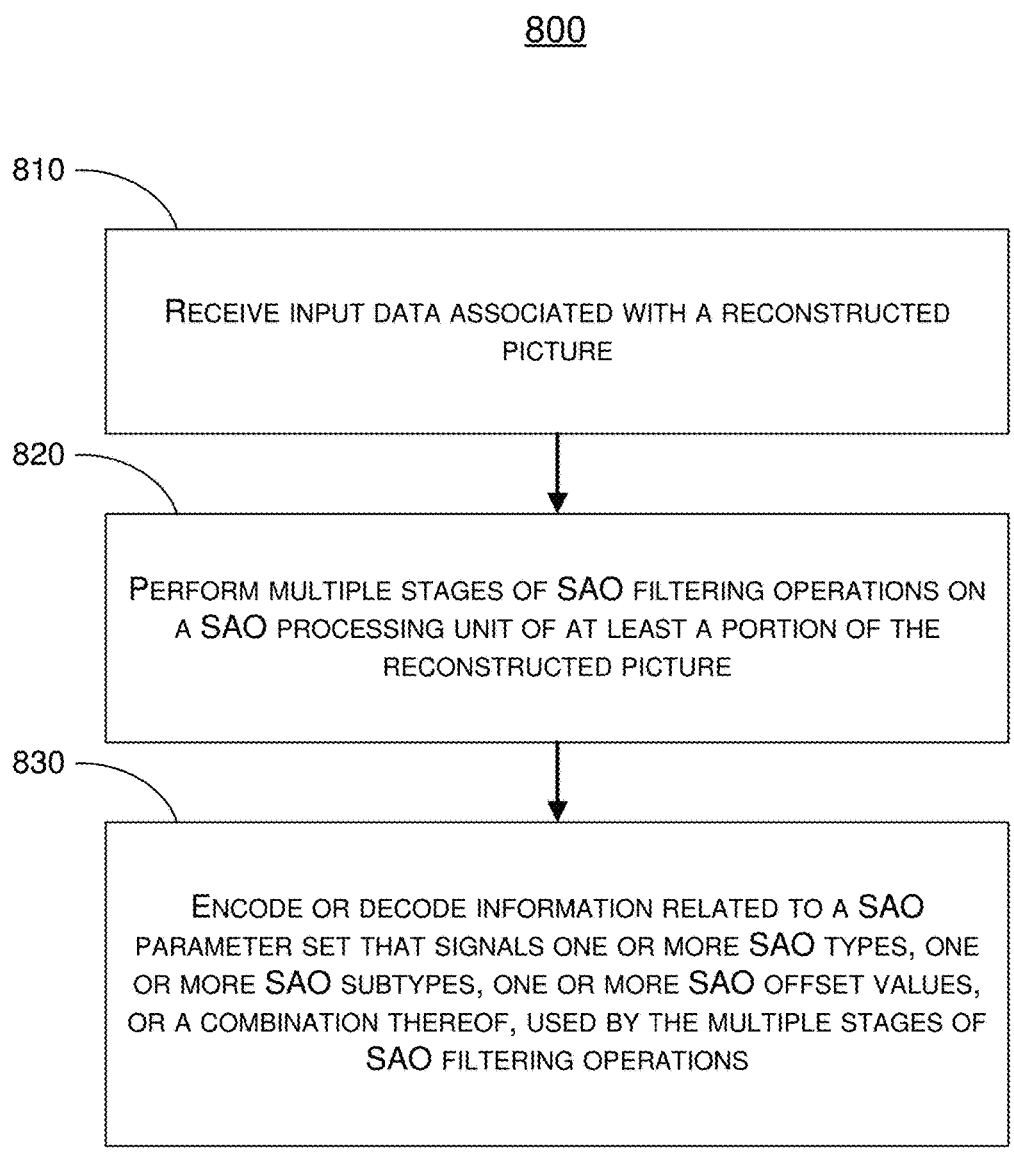
FIG. 8 is a flowchart of an exemplary process of SAO processing a reconstructed picture in an image or video coding system in accordance with an implementation of the present disclosure.

FIG. 8 is a flowchart of an exemplary process 800 of SAO processing a reconstructed picture in an image or video coding system in accordance with an implementation of the present disclosure.

Exemplary process 800 may include one or more operations, actions, or functions as illustrated by one or more of blocks 810, 820 and 830. Although illustrated as discrete blocks, various blocks may be divided into additional blocks, combined into fewer blocks, or eliminated, depending on the desired implementation. Exemplary process 800 may be implemented by exemplary device 700 or a processor of a special-purpose computing device, e.g., an encoder, decoder or codec. For illustrative purposes, the operations described below are performed by exemplary device 700.

At 810, exemplary process 800 may involve SAO filter 720 of exemplary device 700 receiving input data associated with the reconstructed picture. For example, SAO filter 720 may receive the input data from deblocking filter 710 of exemplary device 700.

At 820, exemplary process 800 may involve SAO filter 720 of exemplary device 700 performing multiple stages of SAO filtering operations on a SAO processing unit of at least a portion of the reconstructed.

At 830, exemplary process 800 may involve coding module 730 of exemplary device 700 encoding or decoding information related to a SAO parameter set that signals one or more SAO types, one or more SAO subtypes, one or more SAO offset values, or a combination thereof, used by the multiple stages of SAO filtering operations.

In at least some implementations, in performing the multiple stages of SAO filtering operations on the SAO processing unit, exemplary process 800 may involve SAO filter 720 performing a BO type of filtering operation in a consecutive order followed by an EO type of filtering operation or performing the EO type of filtering operation in a consecutive order followed by the BO type of filtering operation.

In at least some implementations, in performing the multiple stages of SAO filtering operations on the SAO processing unit, exemplary process 800 may involve SAO filter 720 utilizing one or more output pixels from a previous SAO filtering operation for sample classification of a current SAO filtering operation to derive a SAO category index for the current SAO filtering operation.

In at least some implementations, in performing the multiple stages of SAO filtering operations on the SAO processing unit, exemplary process 800 may involve SAO filter 720 utilizing one or more input pixels from the reconstructed picture subject to SAO processing for sample classification to derive one or more SAO category indices for the multiple stages of SAO filtering operations.

In at least some implementations, the EO type of filtering operation may be performed before the BO type of filtering operation. The BO type of filtering operation may utilize one or more output pixels from a final EO type of filtering operation for sample classification to derive one or more SAO category indices.

In at least some implementations, exemplary process 800 may further involve SAO filter 720 predicting values of one or more syntax elements in the SAO parameter set for a current SAO filtering operation based on related syntax elements of the SAO parameter set in a previous SAO filtering operation.

In at least some implementations, exemplary process 800 may further involve SAO filter 720 utilizing related syntax elements in the SAO parameter set in a previous SAO filtering operation for entropy coding the syntax elements in the SAO parameter set for a current SAO filtering operation to derive a modeling context.

In at least some implementations, exemplary process 800 may further involve SAO filter 720 inferring the one or more SAO offset values to be equal to zero for a first color component in a current SAO filtering operation in response to the one or more SAO offset values being equal to zero for the first color component in a previous SAO filtering operation for the SAO processing unit.

In at least some implementations, exemplary process 800 may further involve SAO filter 720 inferring the one or more SAO offset values to be equal to zero for a first color component in a current SAO filtering operation in response to the one or more SAO offset values being equal to zero for the first color component in a previous SAO filtering operation for the SAO processing unit. The current SAO filtering operation and the previous SAO filtering operation may be of a same SAO type.

In at least some implementations, exemplary process 800 may further involve SAO filter 720 coding a syntax element in a bitstream to indicate a number of the SAO filtering operations on a region of the reconstructed picture.

In at least some implementations, the SAO processing unit may include a CTU.

In at least some implementations, exemplary process 800 may further involve SAO filter 720 re-using an existing syntax for coding the SAO parameter set to code the SAO parameter set for one or more additional SAO filtering operations in a CTU.

In at least some implementations, exemplary process 800 may further involve SAO filter 720 re-using an existing syntax for coding the SAO parameter set to code the SAO parameter set for one or more additional SAO filtering operations in a CTU except for skipping coding the SAO parameter set having the one or more SAO offset values equal to zero for all color components in a previous SAO filtering operation. Exemplary process 800 may also involve SAO filter 720 inferring uncoded parameter sets to be equal to zero.

In at least some implementations, exemplary process 800 may further involve SAO filter 720 coding a syntax flag in a SPS extension to enable usage of the more than one SAO tools on a CTU in a current coded bitstream. Exemplary process 800 may also involve SAO filter 720 coding a syntax element in a slice segment header to indicate a number of the SAO filtering operations on a CTU.

In at least some implementations, in performing the multiple stages of SAO filtering operations on a SAO processing unit of at least a portion of the reconstructed picture, deblocked picture, or in-loop filtered picture, exemplary process 800 may involve SAO filter 720 processing a region of the reconstructed picture by a plurality of stages of SAO processing operations. Moreover, SAO filtering operations and other in-loop filtering operations (e.g., performed by other in-loop filters) may be performed in different orders. The term "reconstructed picture" herein refers to an output picture processed by the previous in-loop filter, if there is any.

In at least some implementations, exemplary process 800 may further involve SAO filter 720 partitioning at least a region of the reconstructed picture by a quadtree decomposition. Exemplary process 800 may also involve SAO filter 720 processing each quadtree node region of the quadtree decomposition by one or more of the multiple stages of SAO processing operations.

In at least some implementations, in performing the multiple stages of SAO filtering operations on the SAO processing unit, exemplary process 800 may involve SAO filter 720 performing the at least one stage of the SAO filtering operations on a CTU-based SAO processing unit. Exemplary process 800 may also involve SAO filter 720 performing at least one stage of the SAO filtering operations on a quadtree-based SAO processing unit.

In at least some implementations, in performing the multiple stages of SAO filtering operations, exemplary process 800 may involve SAO filter 720 performing the multiple stages of SAO filtering operations in a pre-defined consecutive order without signaling the one or more SAO types or the one or more SAO subtypes.

In at least some implementations, a SAO processing unit may cover a region in the reconstructed picture, a deblocked picture, or an in-loop filtered picture. The size of the region may be adaptively controlled by a syntax element in the SAO parameter set.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method for sample adaptive offset (SAO) processing a reconstructed picture in an image or video coding system, comprising:
   receiving input data associated with the reconstructed picture;
   performing multiple stages of SAO filtering operations on a SAO processing unit of at least a portion of the reconstructed picture; and
   encoding or decoding information related to a SAO parameter set that signals one or more SAO types, one or more SAO subtypes, one or more SAO offset values, or a combination thereof, used by the multiple stages of SAO filtering operations,
   wherein a higher-level syntax element that indicates whether usage of a plurality of SAO filtering operations on one SAO processing unit is enabled is incorporated in a bitstream, and when the higher-level syntax element indicates that the usage of the plurality of SAO filtering operations on the one SAO processing unit is enabled, a lower-level syntax element indicating a maximum number of the SAO filtering operations is incorporated in the bitstream,
   wherein a prediction or entropy coding process of one or more syntax elements in the SAO parameter set for a current SAO filtering operation of the multiple stages of SAO filtering operations performed on the SAO processing unit is related to a previous SAO filtering operation of the multiple stages of SAO filtering operations performed on the SAO processing unit, and
   wherein related syntax elements in the SAO parameter set in a previous SAO filtering operation are used for deriving context modeling for entropy coding the syntax elements in the SAO parameter set for a current SAO filtering operation.

2. The method of claim 1, wherein performing the multiple stages of SAO filtering operations on the SAO processing unit comprises performing a band offset (BO) type of filtering operation in a consecutive order followed by an edge offset (EO) type of filtering operation or performing the EO type of filtering operation in a consecutive order followed by the BO type of filtering operation.

3. The method of claim 1, wherein performing the multiple stages of SAO filtering operations on the SAO processing unit comprises utilizing one or more output pixels from the previous SAO filtering operation for sample classification of the current SAO filtering operation to derive a SAO category index for the current SAO filtering operation.

4. The method of claim 1, wherein perfoiming the multiple stages of SAO filtering operations on the SAO processing unit comprises utilizing one or more input pixels from the reconstructed picture subject to SAO processing for sample classification to derive one or more SAO category indices for the multiple stages of SAO filtering operations.

5. The method of claim 2, wherein the EO type of filtering operation is performed before the BO type of filtering operation, and wherein the BO type of filtering operation utilizes one or more output pixels from a final EO type of filtering operation for sample classification to derive one or more SAO category indices.

6. The method of claim 1, further comprising:
predicting values of one or more syntax elements in the SAO parameter set for the current SAO filtering operation based on related syntax elements of the SAO parameter set in the previous SAO filtering operation.

7. The method of claim 1, further comprising:
utilizing related syntax elements in the SAO parameter set in the previous SAO filtering operation for entropy coding the syntax elements in the SAO parameter set for the current SAO filtering operation to derive a modeling context.

8. The method of claim 1, further comprising:
inferring the one or more SAO offset values to be equal to zero for a first color component in the current SAO filtering operation in response to the one or more SAO offset values being equal to zero for the first color component in the previous SAO filtering operation for the SAO processing unit.

9. The method of claim 1, further comprising:
inferring the one or more SAO offset values to be equal to zero for a first color component in the current SAO filtering operation in response to the one or more SAO offset values being equal to zero for the first color component in the previous SAO filtering operation for the SAO processing unit, and wherein the current SAO filtering operation and the previous SAO filtering operation are of a same SAO type.

10. The method of claim 1, further comprising: coding a syntax element in a bitstream to indicate a number of the SAO filtering operations on a region of the reconstructed picture.

11. The method of claim 1, wherein the SAO processing unit comprises a coding tree unit (CTU).

12. The method of claim 11, further comprising:
re-using an existing syntax for coding the SAO parameter set to code the SAO parameter set for one or more additional SAO filtering operations in a CTU.

13. The method of claim 11, further comprising:
re-using an existing syntax for coding the SAO parameter set to code the SAO parameter set for one or more additional SAO filtering operations in a CTU except for skipping coding the SAO parameter set having the one or more SAO offset values equal to zero for all color components in the previous SAO filtering operation; and
inferring uncoded parameter sets to be equal to zero.

14. The method of claim 11, further comprising:
coding a syntax flag in a sequence parameter set (SPS) extension to enable usage of the more than one SAO tools on a CTU in a current coded bitstream; and
coding a syntax element in a slice segment header to indicate a maximum number of the SAO filtering operations on a CTU.

15. The method of claim 1, further comprising: partitioning at least a region of the reconstructed picture by a quadtree decomposition; and processing each quadtree node region of the quadtree decomposition by one or more of the multiple stages of SAO processing operations.

16. The method of claim 1, wherein performing the multiple stages of SAO filtering operations on the SAO processing unit comprises: performing at least one stage of the SAO filtering operations on a coding tree unit (CTU)-based SAO processing unit; and performing at least one stage of the SAO filtering operations on a quadtree-based SAO processing unit.

17. The method of claim 1, wherein performing the multiple stages of SAO filtering operations comprises performing the multiple stages of SAO filtering operations in a pre-defined consecutive order without signaling the one or more SAO types or the one or more SAO subtypes.

18. The method of claim 1, wherein a SAO processing unit covers a region in the reconstructed picture, deblocked picture, or in-loop filtered picture, and wherein a size of the region is adaptively controlled by a syntax element in the SAO parameter set.

19. A device implementable in an image or video coding system, comprising:
a reconstruction circuit configured to reconstruct a video picture;
a sample adaptive offset (SAO) filter coupled to the reconstruction circuit to receive input data associated with the reconstructed video picture, a deblocked picture, or an in-loop filtered picture, the SAO filter configured to perform multiple stages of SAO filtering operations on a SAO processing unit of at least a portion of the reconstructed picture; and
a coding circuit configured to encode or decode information related to a SAO parameter set that signals one or more SAO types, one or more SAO subtypes, one or more SAO offset values, or a combination thereof, used by the SAO filter in performing the multiple stages of SAO filtering operations,
wherein a higher-level syntax element that indicates whether usage of a plurality of SAO filtering operations on one SAO processing unit is enabled is incorporated in a bitstream, and when the higher-level syntax element indicates that the usage of the plurality of SAO filtering operations on the one SAO processing, unit is enabled, a lower-level syntax element indicating a maximum number of the SAO filtering operations is incorporated in the bitstream,
wherein a prediction or entropy coding process of one or more syntax elements in the SAO parameter set for a current SAO filtering operation of the multiple stages of SAO filtering operations performed on the SAO processing unit is related to a previous SAO filtering operation of the multiple stages of SAO filtering operations performed on the SAO processing unit, and
wherein related syntax elements in the SAO parameter set in a previous SAO filtering operation are used for deriving context modeling for entropy coding the syntax elements in the SAO parameter set for a current SAO filtering operation.

20. The device of claim 19, wherein, in performing the multiple stages of SAO filtering operations on the SAO processing unit, the SAO filter is configured to perform a band offset (BO) type of filtering operation in a consecutive order followed by an edge offset (EO) type of filtering operation or to perform the EO type of filtering operation in a consecutive order followed by the BO type of filtering operation.

21. The method of claim 1 wherein the higher-level syntax element is a sequence parameter set (SPS) syntax flag, and the lower-level syntax element is a slice segment header.

* * * * *